United States Patent
Takahashi et al.

(10) Patent No.: US 9,467,331 B2
(45) Date of Patent: Oct. 11, 2016

(54) MOBILE COMMUNICATION METHOD, MOBILE STATION, AND RADIO BASE STATION

(75) Inventors: Hideaki Takahashi, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 97 days.

(21) Appl. No.: 14/129,466

(22) PCT Filed: Jun. 25, 2012

(86) PCT No.: PCT/JP2012/066122
§ 371 (c)(1),
(2), (4) Date: Dec. 26, 2013

(87) PCT Pub. No.: WO2013/002166
PCT Pub. Date: Jan. 3, 2013

(65) Prior Publication Data
US 2014/0204733 A1    Jul. 24, 2014

(30) Foreign Application Priority Data

Jun. 29, 2011   (JP) .................................. 2011-144419

(51) Int. Cl.
*H04L 12/24*    (2006.01)
*H04W 36/00*    (2009.01)

(52) U.S. Cl.
CPC ...... *H04L 41/0654* (2013.01); *H04W 36/0033* (2013.01)

(58) Field of Classification Search
None
See application file for complete search history.

(56) References Cited

U.S. PATENT DOCUMENTS

2009/0239538 A1    9/2009  Motegi et al.
2010/0278147 A1*  11/2010  Horn ..................... H04W 36/08
                                                    370/331

FOREIGN PATENT DOCUMENTS

| WO | 2007/100108 A1 | 9/2007 | |
|---|---|---|---|
| WO | 2009/155573 A1 | 12/2009 | |
| WO | WO 2009155573 A1 * | 12/2009 | ........ H04W 36/0088 |

OTHER PUBLICATIONS

3GPP TSG-RAN WG3 #64 Rs-091027 May 4-8, 2008 Qualcomm "Network Based solutions to inbound mobility in the presence of PCI confusion" pp. 1-4.*

(Continued)

*Primary Examiner* — Hassan Phillips
*Assistant Examiner* — Ayanah George
(74) *Attorney, Agent, or Firm* — Osha Liang LLP

(57) ABSTRACT

A reconnection procedure is successfully performed even when a connection destination radio base station does not manage "UE Context" for a mobile station UE. A mobile communication method according to the present invention includes a step B in which the mobile station UE transmits CGI of cell #1 to a radio base station eNB#2 in the reconnection procedure, and a step C in which the radio base station eNB#2 acquires "UE Context" for the mobile station UE from a radio base station eNB#1 managing cell #1 designated based on the CGI when not managing "UE Context" for the mobile station UE in the reconnection procedure.

5 Claims, 5 Drawing Sheets

(56) References Cited

OTHER PUBLICATIONS

3GPP TSG-RAN WG2 #66 May 4-8, 2008 Qualcomm "Access Stratum based solution to connection recovery after RLF" pp. 1-6.*
3GPP TSG-RAN WG3 #64 Rs-091027 May 4, 2008 Qualcomm "Network Based solutions to inbound mobility in the presence of PCI conusion" pp. 1-4.*
3GPP TSG-RAN WG2 #66 May 4-8, 2008 Qualcomm "Access Stratum based on solutions to connection recovery RLF" pp. 1-6.*
3GPP TSG-RAN WG3 #64 Rs-091027 May 4, 2008 Qualcomm "Network Based Solutions to Inbound Mobility in the Presence of PCI confusion" pp. 1-4.*
3GPP TSG-RAN WG2 #66 May 4-8, 2008 Qualcomm "Access Stratum based on solutions to connection recoverty RLF" pp. 1-6.*
International Search Report for corresponding International Application No. PCT/JP2012066122, mailed Jul. 31, 2012 (4 pages).
Qualcomm Europe et al.; "Network based solutions to inbound mobility in the presence of PCI confusion;" 3GPP TSG-RAN WG3 #64, R3-091027; San Francisco, USA; May 4-8, 2008 (4 pages).
Qualcomm Europe; "Access Stratum based solution to connection recovery after RLF;" 3GPP TSG RAN WG2 #66, R2-093242; San Francisco, USA; May 4-8, 2009 (6 pages).
Nokia Siemens Networks; "Enabling UE-originated RLF reporting for SON MRO;" 3GPP TSG RAN WG3 Meeting #66-bis, R3-100239; Valencia, Spain; Jan. 18-22, 2010 (4 pages).
Nokia Siemens Networks; "Addition of a description of a procedure to fetch UE context;" 3GPP TSG-RAN WG3 Meeting #66-bis, R3-100240; Valencia, Spain; Jan. 18-22, 2010 (4 pages).
Nokia Siemens Networks et al.; "A procedure to fetch UE contect in case of post-RLF RRC reestablishment" 3GPP TSG-RAN WG3 Meeting #66-bis, R3-100241; Valencia, Spain; Jan. 18-22, 2010 (54 pages).
3GPP TS 36.423 V10.4.0; "3rd Generation Partnership Project; Technical Specification Group Radio Access Network; Evolved Universal Terrestrial Radio Access Network (E-UTRAN); X2 application protocol (X2AP) (Release 10)" Dec. 2011 (132 pages).
3GPP TS 36.300 V10.6.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)" Dec. 2011 (194 pages).
Office Action in a counterpart Japanese Patent Application No. 2011-144419 issued Sep. 29, 2015 (6 pages).

* cited by examiner

MOBILE COMMUNICATION METHOD, MOBILE STATION, AND RADIO BASE STATION

TECHNICAL FIELD

The present invention relates to a mobile communication method, a mobile station, and a radio base station.

BACKGROUND ART

In recent years, there is discussed "Heterogeneous Network (HetNet)" as one method for increasing a network capacity for increasing traffics.

In "HetNet", a plurality of picocells are located in a conventional macrocell so that traffics such as hot spot are absorbed in the picocells while a coverage is ensured in the macrocell, thereby increasing the capacity of the entire network.

In this way, when a large number of picocells are located, many picocells using the same PCI (Physical Cell Identity) are likely to be present in an area (or a neighboring area) of one macrocell (radio base station eNB). Therefore, there is a problem that the macrocell (radio base station eNB) cannot uniquely designate a picocell due to the neighboring picocells with only the PCI.

Handover from macrocell to picocell (or femtocell), or "issue on PCI confusion" for "inbound HO" is defined in its solution in the LTE (Long Term Evolution) Release-9 system.

With the solution, CGI (Cell Global Identity) of a neighboring picocell (femtocell) with better reception quality is reported from a mobile station UE, thereby uniquely determining a handover-destination cell in the macrocell (radio base station eNB).

FIG. 6 illustrates a reconnection procedure in the LTE Release 8/9/10 systems.

As illustrated in FIG. 6, in the LTE Release 8/9/10 systems, in step S3001, when detecting RLF (Radio Link Failure) in cell #1 under a radio base station eNB#1, a mobile station UE starts a reconnection procedure for a radio base station eNB#2 managing cell #2 selected in a cell selection processing.

At this time, if the reconnection destination radio base station eNB#2 is managing "UE Context" for the mobile station UE, the reconnection procedure is successfully performed.

In step S3005, the radio base station eNB#2 compares "source PCI", "source C-RNTI (Cell-Radio Network Temporary Identity" or "short MAC-I" transferred from the radio base station eNB#1 in a "HO preparation processing (step S3002)" with "source PCI", "source C-RNTI" or "Short MAC-I" contained in "RRCConnectionReestablishmentRequest" transmitted by the mobile station UE, thereby performing a "matching processing (mobile station UE designating processing)" and a "verification processing" on "UE Context."

The radio base station eNB#1 transfers a security parameter (such as algorithm, KeNB* or NCC) to the radio base station eNB#2 in the "HO preparation processing (step S3002)."

The security parameter is required to keep security between the mobile station UE and the radio base station eNB#2 after completion of the reconnection procedure.

When the mobile station UE is designated and verified, in step S3006, the radio base station eNB#2 transmits "RRCConnectionReestablishment" to the mobile station UE.

Then, communication after "RRCConnectionReestablishmentComplete" in step S3007 is made with a security processing ("ciphering" or "integrity protection").

"SRB1 "Signaling Radio Beater 1)" is set by "RRCConnectionReestablishment" in step S3006, and then "SRB2" or "DRB (Dedicated Radio Bearer)" is reconfigured by "RRCReconfiguration" in step S3011 and the communication is continued.

The routing in the network is switched by "S1 path switch request" in step S3008 and "S1 path switch response" in step S3009.

Herein, if the "matching processing" and the "verification processing" in step S3005 fail, the radio base station eNB#2 transmits "RRCConnectionReestablishmentReject", instead of "RRCConnectionReestablishment" to the mobile station UE in step S3006.

When receiving "RRCConnectionReestablishment Reject", the mobile station UE transits to an "Idle state."

CITATION LIST

Non-Patent Literatures

Non-Patent Literature 1: 3GPP R3-100239
Non-Patent Literature 2: 3GPP R3-100240
Non-Patent Literature 3: 3GPP R3-100241

SUMMARY OF INVENTION

As described above, when the radio base station eNB#2 does not manage "UE Context" for the mobile station UE, the reconnection procedure for the mobile station UE will fail in the LTE system.

The present invention has been made in terms of the above problem, and it is an object thereof to provide a mobile communication method capable of successfully performing a reconnection procedure even when a reconnection destination radio base station does not manage "UE Context" for a mobile communication UE, a mobile station, and a radio base station.

A first aspect of the present invention is a mobile communication method, the method including a step A in which when detecting a radio link failure in a first cell under a first radio base station, a mobile station starts a reconnection procedure for a second radio base station managing a second cell selected in a cell selection processing, a step B in which the mobile station transmits CGI of the first cell to the second radio base station in the reconnection procedure, and a step C in which in the reconnection procedure, when not managing context information of the mobile station, the second radio base station acquires context information of the mobile station from the first radio base station managing the first cell designated based on the CGI.

A second aspect of the present invention is a mobile station, the mobile station including a control unit configured to start a reconnection procedure for a second radio base station managing a second cell selected in a cell selection processing when detecting a radio link failure in a first cell under a first radio base station, and a transmission unit configured to transmit CGI of the first cell to the second radio base station in the reconnection procedure.

A third aspect of the present invention is a radio base station which operates as a second radio base station when a mobile station starts a reconnection procedure for the second radio base station managing a second cell selected in a cell selection processing when detecting a radio link failure in a first cell under a first radio base station, wherein the radio base station includes a reception unit configured to acquire context information of the mobile station from the first radio base station managing the first cell designated based on CGI of the first cell transmitted by the mobile station when not managing the context information for the mobile station in the reconnection procedure.

DESCRIPTION OF EMBODIMENTS (Mobile Communication System According to First Embodiment of the Present Invention)

A mobile communication system according to a first embodiment of the present invention will be described with reference to FIGS. 1 to 4.

Figure 1:
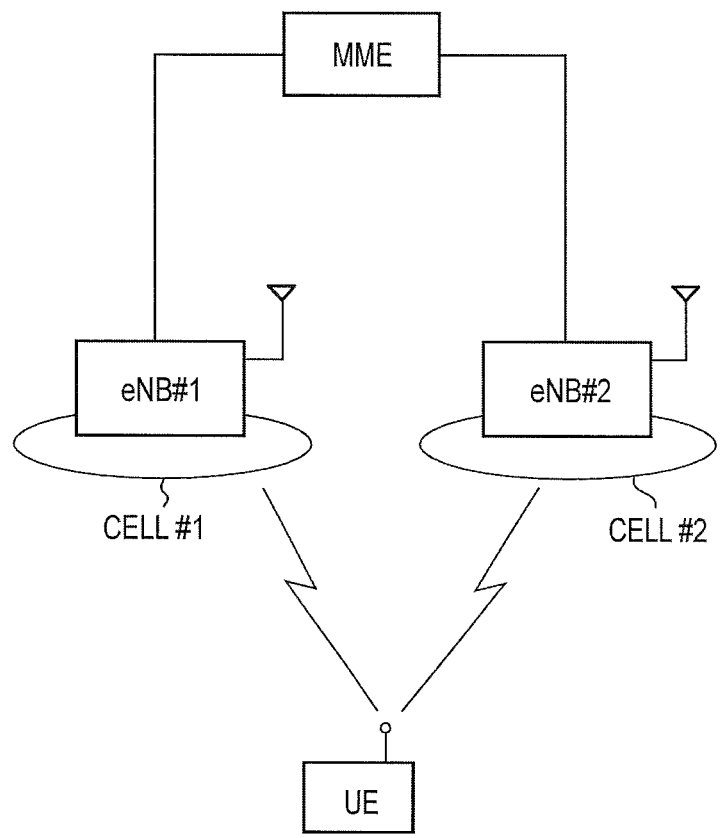
FIG. 1 is a configuration diagram of an entire mobile communication system according to a first embodiment of the present invention.

The mobile communication system according to the present embodiment is a mobile communication system in the LTE system (or LTE-Advanced system), and includes a mobility management node MME (Mobility Management Entity), a radio base station eNB#1 for managing cell #1, and a radio base station eNB#2 for managing cell #2 as illustrated in FIG. 1.

The present embodiment will be described by way of a case in which when detecting RLF in cell #1 under the radio base station eNB#1, a mobile station UE starts a reconnection procedure for the radio base station eNB#2 managing cell #2 selected in a cell selection processing.

Figure 2:
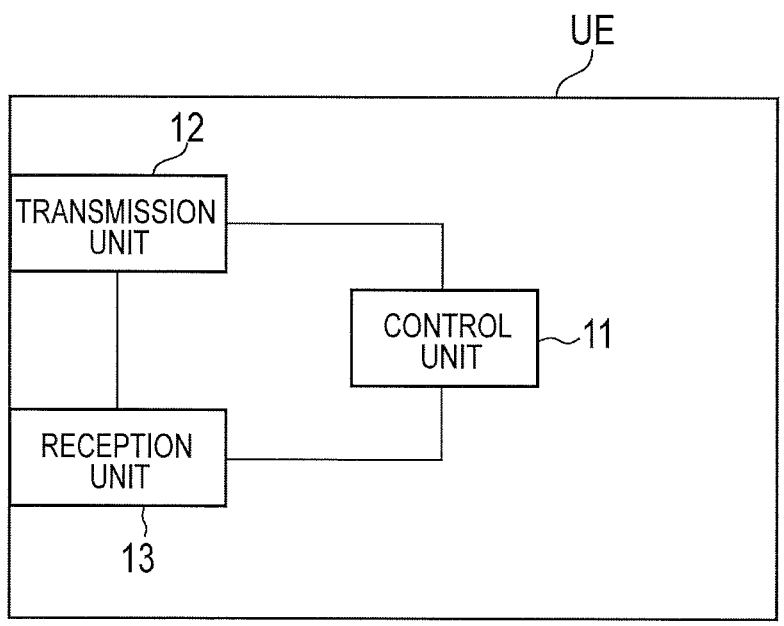
FIG. 2 is a functional block diagram of a mobile station according to the first embodiment of the present invention.

As illustrated in FIG. 2, the mobile station UE according to the present embodiment includes a control unit 11, a transmission unit 12, and a reception unit 13.

There is configured such that when detecting RLF in cell #1 under the radio base station eNB#1, the control unit 11 performs the cell selection processing and starts the reconnection procedure for the radio base station eNB#2 managing cell #2 selected in the cell selection processing.

The transmission unit 12 is configured to transmit various signals to the radio base station eNB#1/eNB#2.

For example, the transmission unit 12 is configured to transmit CGI of cell #1 to the radio base station eNB#2 in the above reconnection procedure.

The transmission unit 12 may be configured to transmit "CGI available" indicating whether CGI of cell #1 can be transmitted to the radio base station eNB#2 via "RRCConnectionReestablishment Request."

For example, the transmission unit 12 may be configured to transmit "CGI available" by an 1-bit flag in "RRCConnectionReestablishment Request."

The reception unit 13 is configured to receive various signals from the radio base station eNB#1/eNB#2.

For example, the reception unit 13 is configured to receive "CGI request" for requesting to transmit CGI of cell #1 from the radio base station eNB#2.

Specifically, the reception unit 13 may be configured to receive "CGI request" from the radio base station eNB#2 via "RRCConnectionReestablishment."

Further, there may be configured such that when the reception unit 13 receives "RRCConnectionReestablishment" containing "CGI request", the transmission unit 12 transmits CGI of cell #1 to the radio base station eNB#2 via "RRCConnectionReestablishmentComplete."

For example, the reception unit 13 may be configured to receive "CGI request" by an 1-bit flag in "RRCConnectionReestablishment."

The transmission unit 12 may be configured not to perform a security processing on "RRCConnectionReestablishmentComplete" containing CGI of cell #1.

Herein, the transmission unit 12 is configured to perform the security processing on "RRCConnectionReestablishmentComplete" not containing CGI of cell #1.

The transmission unit 12 may be configured to transmit CGI of cell #1 to the radio base station eNB#2 via other message or the like transmitted on "RRCConnectionReestablishment Request" or DCCH (Dedicated Common Control Channel/SRB1).

Figure 3:
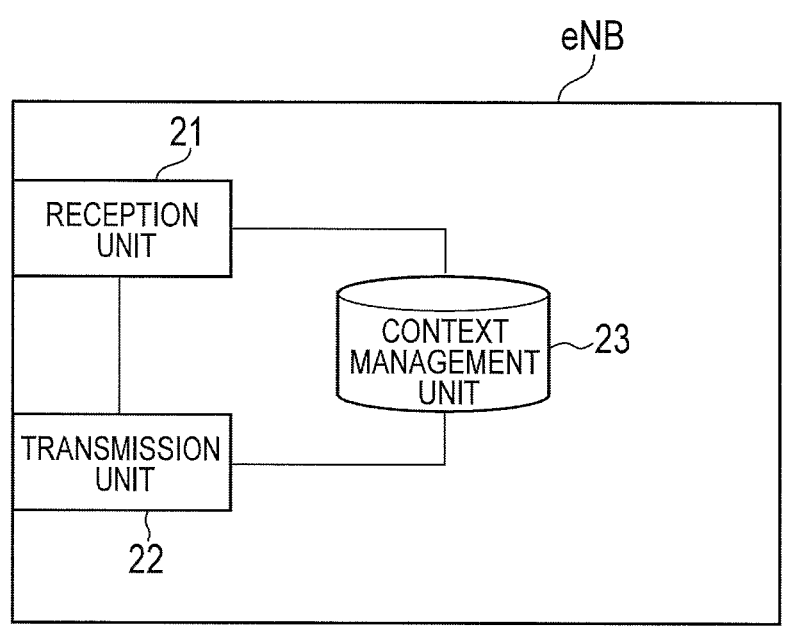
FIG. 3 is a functional block diagram of a radio base station according to the first embodiment of the present invention.

As illustrated in FIG. 3, the radio base station eNB according to the present embodiment includes a reception unit 21, a transmission unit 22, and a context management unit 23.

The context management unit 23 is configured to manage "UE Context" for each mobile station UE.

Specifically, the context management unit 23 is configured to manage "UE Context" for a mobile station UE transferred in the "HO Preparation processing" performed by a neighboring radio base station eNB.

The reception unit 21 is configured to receive various signals from the mobile station UE, and the transmission unit 22 is configured to transmit various signals to the mobile station UE.

In the reconnection procedure, when the context management unit 23 in the radio base station eNB#2 does not manage "UE Context" for the mobile station UE, the reception unit 21 in the radio base station eNB#2 is configured to acquire "UE Context" for the mobile station UE from the radio base station eNB#1 managing cell #1 designated based on CGI of cell #1 transmitted by the mobile station UE.

When the reception unit 21 in the radio base station eNB#2 receives "CGI available" from the mobile station UE via "RRCConnectionReestablishmentRequest" and when the received "CGI available" indicates whether CGI of cell #1 can be transmitted, the transmission unit 22 in the radio base station eNB#2 is configured to transmit "CGI request" requesting to transmit CGI of cell #1 to the mobile station UE via "RRCConnectionReestablishment."

There is configured such that when the reception unit 21 in the radio base station eNB#1 receives "X2 RLF report" from the radio base station eNB#2, the transmission unit 22 in the radio base station eNB#1 determines whether "UE Context" matching with "source C-RNT1" and "short MAC-I" contained in "X2 RLF report" is managed by the context management unit 23, only when determining that it is managed, performs the "HO preparation processing" on the radio base station eNB#2.

Exemplary specific operations of the mobile communication system according to the present embodiment will be described below with reference to FIG. 4.

Figure 4:
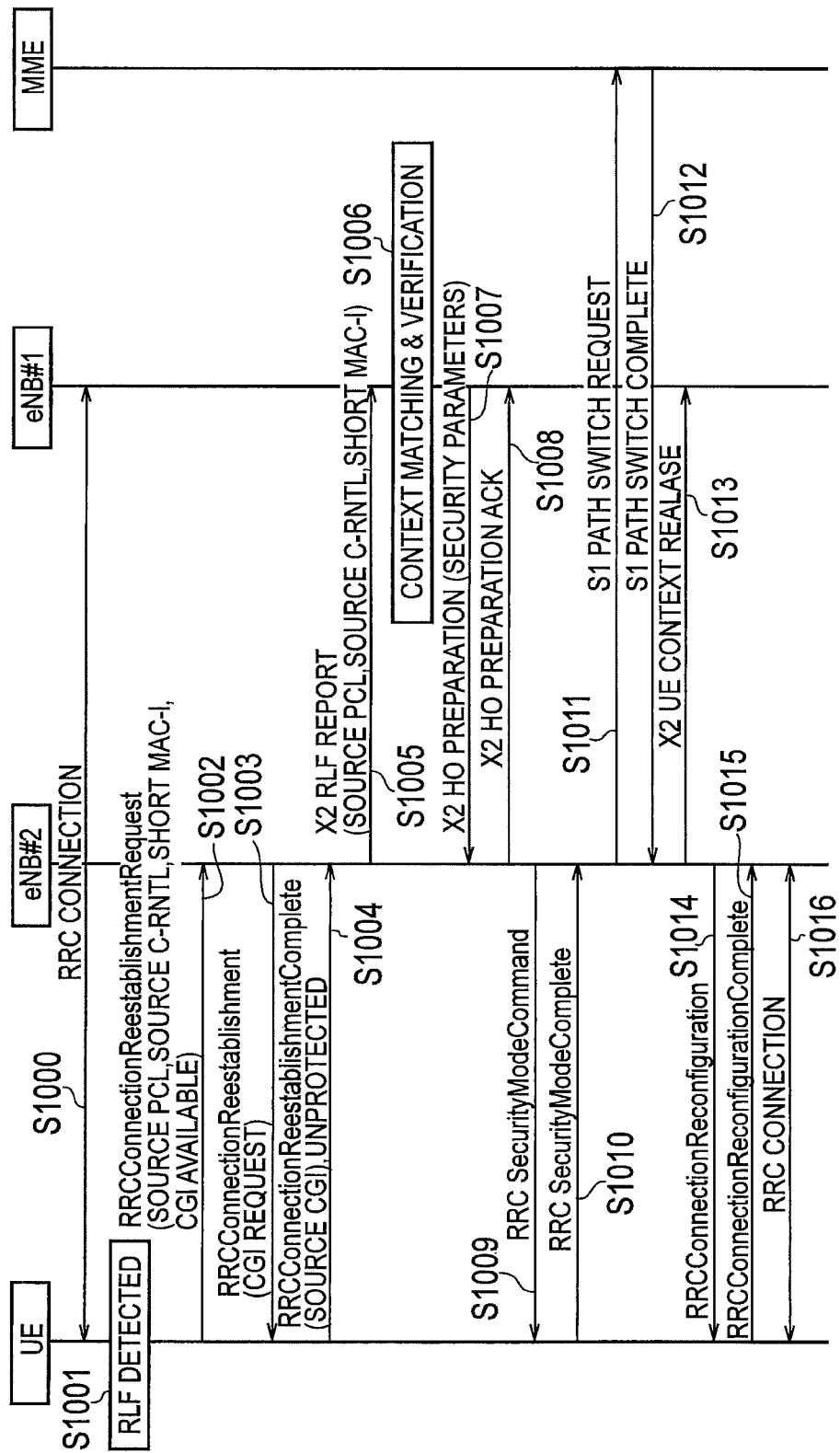
FIG. 4 is a diagram for explaining operations of the mobile communication system according to the first embodiment of the present invention.

As illustrated in FIG. 4, when detecting RLF in cell #1 under the radio base station eNB#1 in step S1001, the mobile station UE transmits "RRCConnectionReestablishmentRequest" containing "source PCI", "source C-RNTI", "short MAC-I" and "CSG available" to the radio base station eNB#2 managing cell #2 selected in the cell selection processing in step S1002.

When the received "CSG available" indicates that CGI of cell #1 can be transmitted, the radio base station eNB#2 transmits "RRCConnectionReestablishment" containing "CGI request" requesting to transmit CGI of cell #1 to the mobile station UE in step S1003.

In step S1004, the mobile station UE transmits "RRCConnectionReestablishmentComplete" containing CGI (or "source CGI") of cell #1 to the radio base station eNB#2.

Herein, the mobile station UE does not perform the security processing (particularly, "ciphering") on "RRCConnectionReestablishmentComplete" containing CGI of cell #1 unlike conventional "RRCConnectionReestablishmentComplete."

This is because the radio base station eNB#2 is not provided with a security parameter at this time and thus the radio base station eNB#2 cannot decipher the security processing ("deciphering").

The mobile station UE can determine whether to perform the security processing based on whether "CGI request" is transmitted by an 1-bit flag in "RRCConnectionReestablishment."

In step S1005, the radio base station eNB#2 designates the radio base station eNB#1 based on CGI of cell #1, and transmits "X2 RLF report" containing "source PCI", "source C-RNTI", and "short MAC-I" to the radio base station eNB#1.

In step S1006, the radio base station eNB#1 performs the "matching processing" and the "verification processing" on "UE Context" for the mobile station UE.

Herein, only when successfully performing the "matching processing" and the "verification processing" on "UE Context" for the mobile station UE, or only when managing "UE Context" for the mobile station UE, the radio base station eNB#1 transmits "X2 HO preparation" containing the security parameter to the radio base station eNB#2 in step S1007.

In step S1008, the radio base station eNB#2 transmits "X2 HO preparation ack" to the radio base station eNB#1.

Herein, the radio base station eNB#2 can acquire the security parameter, and thus uses "RRC SecurityModeCommand" to notify the security parameter to the mobile station UE in step S1009.

In step S1010, the mobile station UE transmits "RRC SecurityModeComplete" to the radio base station eNB#2.

In step S1011, the radio base station eNB#2 transmits "S1 path switch request" to the mobility management node MME, and in step S1012, the mobility management node MME transmits "S1 path switch complete" to the radio base station eNB#2.

In step S1013, the radio base station eNB#2 transmits "X2 UE Context release" to the radio base station eNB#1.

In step S1014, the radio base station eNB#2 transmits "RRCConnectionReconfiguration" for setting SRB, DRB or the like to the mobile station UE, and in step S1015, the mobile station UE transmits "RRCConnectionReconfigurationComplete" to the radio base station eNB#2.

Consequently, in step S1016, RRC connection is established between the mobile station UE and the radio base station eNB#2 (cell #2).

In the conventional LTE system, "RRC SecurityModeCommand" and "RRC SecurityModeComplete" are not transmitted and received in the above reconnection procedure, while in the mobile communication system according to the present embodiment, the security processing is not activated in steps S1003 and S1004 and thus "RRC SecurityModeCommand" and "RRC SecurityModeComplete" are configured to be transmitted and received at this timing.

Consequently, the security processing can be applied in the communication after "RRCConnectionReconfiguration" in step S1014.

"CGI request" or "source CGI (CGI of cell #1)" may be transmitted and received via a dedicated message.

In this case, after the radio base station eNB#2 acquires CGI of cell #1 via a dedicated message, "RRCConnectionReestablishmentComplete" and "RRCConnectionReestablishment" may be transmitted and received similarly as in the conventional LTE system.

In this case, the security processing can be started for transmitting and receiving "RRCConnectionReestablishmentComplete" and "RRCConnectionReestablishment", and thus "RRC SecurityModeCommand" and "RRC SecurityModeComplete" do not need to be transmitted and received.

With the mobile communication system according to the present embodiment, in the above reconnection procedure, the radio base station eNB#2 can acquire "UE Context" for the mobile station UE from the radio base station eNB#1 based on CGI of the first cell acquired from the mobile station UE, and thus the above reconnection procedure can be successfully performed even when "UE Context" for the mobile station UE is not previously managed in the radio base station eNB#2.

With the mobile communication system according to the present embodiment, the radio base station eNB#2 can designate the radio base station eNB#1 managing "UE Context" for the mobile station UE based on CGI of the first cell, and thus the above reconnection procedure can be successfully performed even when "UE Context" for the mobile station UE is not previously managed in the radio base station eNB#2 under an environment in which many cells (such as picocells) using the same PCI are present.

(First Variant)

A mobile communication system according to a first variant of the present invention will be described below with reference to FIG. 5 in terms of the differences from the mobile communication system according to the first embodiment.

It is assumed that many cells (such as picocells) using the same PCI are present in the mobile communication system according to the first variant of the present invention.

Figure 5:
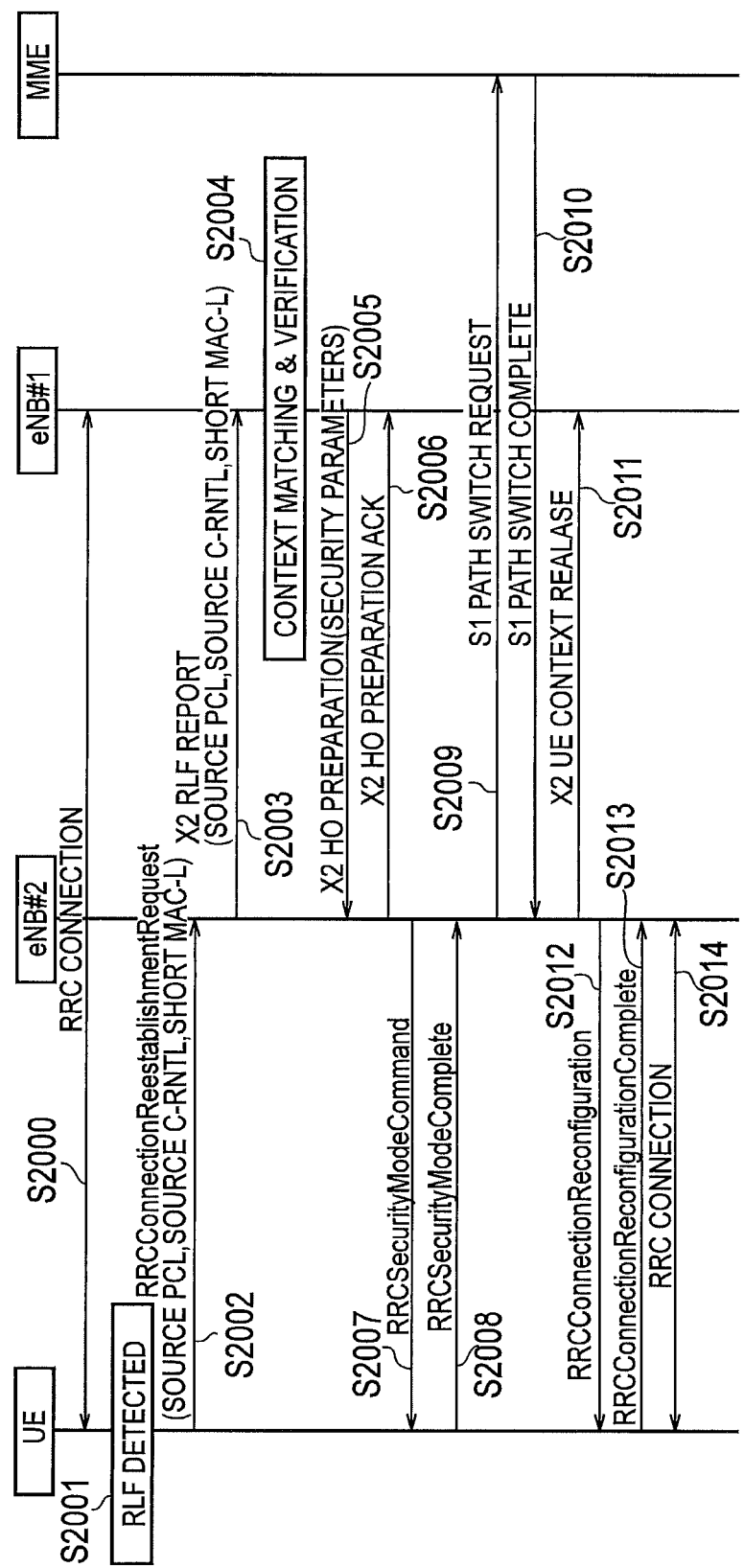
FIG. 5 is a diagram for explaining operations of a mobile communication system according to a second embodiment of the present invention.
Figure 6:
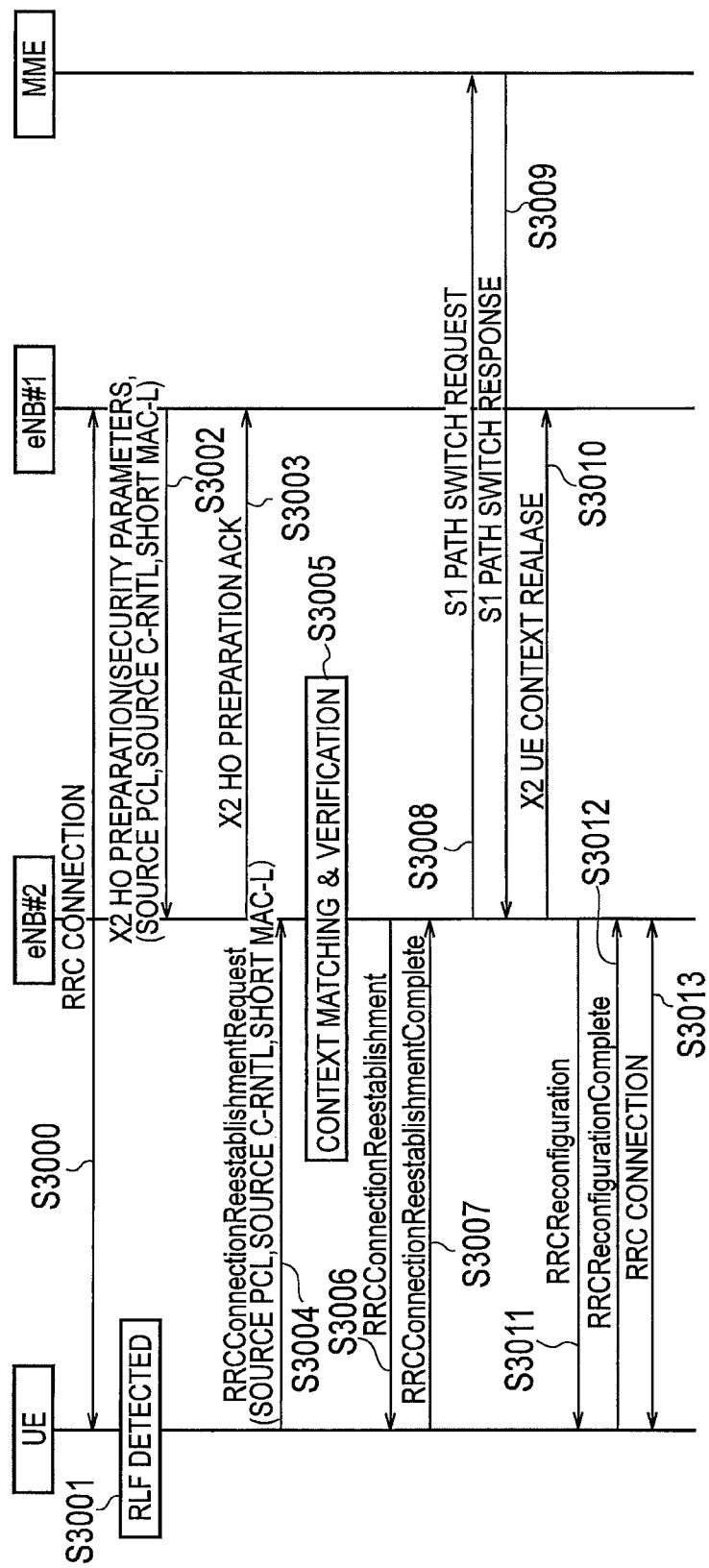
FIG. 6 is a diagram for explaining operations of a conventional mobile communication system.

As illustrated in FIG. 5, when detecting RLF in cell #1 (picocell) under the radio base station eNB#1 in step S2001, the mobile station UE transmits "RRCConnectionReestablishmentRequest" containing "source PCI", "source C-RNTI" and "short MAC-I" to the radio base station eNB#2 managing cell #2 (macrocell) selected in the cell selection processing in step S2002.

In step S2003, when not managing "UE Context" for the mobile station UE, the radio base station eNB#2 transmits "X2 RLF report" containing "source PCI", "source C-RNTI" and "short MAC-I" to all the neighboring radio base stations eNB.

In step S2004, the radio base station eNB having received "X2 RLF report" performs the "matching processing" and the "verification processing" on "UE Context" for the mobile station UE based on "source C-RNTI" and "short MAC-I" contained in "X2 RLF report."

Only when successfully performing the "matching processing" and the "verification processing" on "UE Context" for the mobile station UE, or only when managing "TIE Context" matching with "source C-RNTI" and "source MAC-I" contained in "X2 RLF report", each radio base station eNB (such as radio base station eNB#1) transmits "X2 HO preparation" containing the security parameter to the radio base station eNB#2 in step S2005.

In step S2006, the radio base station eNB#2 transmits "X2 HO preparation ack" to the radio base station eNB#1.

Herein, since the radio base station eNB#2 can acquire the security parameter, in step S2007, it uses "RRC SecurityModeCommand" to notify the security parameter to the mobile station UE.

In step S2008, the mobile station UE transmits "RRC SecurityModeComplete" to the radio base station eNB#2.

In step S2009, the radio base station eNB#2 transmits "S1 path switch request" to the mobility management node MME, and in step S2010, the mobility management node MME transmits "S1 path switch complete" to the radio base station eNB#2.

In step S2011, the radio base station eNB#2 transmits "X2 UE context release" to the radio base station eNB#1.

In step S2012, the radio base station eNB#2 transmits "RRCConnectionReconfiguration" for setting SRB2, DRB or the like to the mobile station UE, and in step S2013, the mobile station UE transmits "RRCConnectionReconfigurationComplete" to the radio base station eNB#2.

Consequently, in step S2014, RRC connection is established between the mobile station UE and the radio base station eNB#2 (cell #2).

With the mobile communication system according to the first variant, since there is configured such that the radio base station eNB#2 transmits "X2 RLF report" containing "source PCI", "source C-RNTI" and "short MAC-I" to all the neighboring radio base stations eNB and the radio base station eNB#1 managing "UE Context" matching with "source C-RNTI" and "short MAC-I" contained in "X2 RLF report" transmits "UE Context (security parameter)" for the mobile station UE to the radio base station eNB#2, even if "UE Context" for the mobile station UE is not previously managed in the radio base station eNB#2 under an environment many cells (such as picocells) using the same PCI are present, the above reconnection procedure can be successfully performed.

The properties of the present embodiment described above may be expressed as follows.

The first property of the present embodiment is a mobile communication method, the method including a step A in which when the mobile station UE detects RLF (radio link failure) in cell #1 (first cell) under the radio base station eNB#1 (first radio base station), the reconnection procedure is started for the radio base station eNB#2 (second radio base station) managing cell #2 selected in the cell selection processing, a step B in which the mobile station UE transmits CGI of cell #1 to the radio base station eNB#2 in the reconnection procedure, and a step C in which when not managing "UE Context (context information)" for the mobile station UE, the radio base station eNB#2 acquires "UE Context" for the mobile station UE from the radio base station eNB#1 managing cell #1 designated based on CGI in the reconnection procedure.

In the first property of the present embodiment, the step B may include a step B1 in which the mobile station UE transmits "CGI available (transmission enable/disable information)" indicating whether CGI of cell #1 can be transmitted to the radio base station eNB#2 via "RRCConnectionReestablishmentRequest (reconnection request signal)", a step B2 in which when the received "CGI available" indicates that CGI of cell #1 can be transmitted, the radio base station eNB#2 transmits "CGI request (request information)" for requesting to transmit CGI of cell #1 to the mobile station UE via "RRCConnectionReestablishment (reconnection signal)", and a step B3 in which the mobile station UE transmits CGI of cell #1 to the radio base station eNB#2 via "RRCConnectionReestablishmentComplete (reconnection complete signal)" in response to "CGI request."

In the first property of the present embodiment, in step B3, the mobile station UE may not perform the security processing on "RRCConnectionReestablishmentComplete."

The second property of the present embodiment is a mobile station UE, which includes the control unit 11 configured to start the reconnection procedure for the radio base station eNB#2 managing cell #2 selected in the cell selection processing when detecting RLF in cell #1 under the radio base station eNB#1, and the transmission unit 12 configured to transmit CGI of cell #1 to the radio base station eNB#2.

In the second property of the present embodiment, the transmission unit 12 is configured to transmit "CGI available" to the radio base station eNB#2 via "RRCConnectionReestablishmentRequest", and the transmission unit 12 may be configured to transmit CGI of cell #1 to the radio base station eNB#2 via "RRCConnectionReestablishmentComplete" when receiving "CGI request" from the radio base station eNB#2.

In the second property of the present embodiment, the transmission unit 12 may be configured not to perform the security processing on "RRCConnectionReestablishmentComplete."

The third property of the present embodiment is a radio base station eNB which operates as the radio base station eNB#2 when the mobile station UE starts the reconnection procedure for the radio base station eNB#2 managing cell #2 selected in the cell selection processing when detecting RLF in cell #1 under the radio base station eNB#1, wherein the radio base station includes the reception unit 21 configured to acquire "UE Context" for the mobile station UE from the radio base station eNB#1 managing cell #1 designated based on CGI of cell #1 transmitted by the mobile station UE when not managing "UE Context" for the mobile station UE in the reconnection procedure.

In the third property of the present embodiment, the radio base station eNB may include the transmission unit 22 configured to transmit "CGI request" for requesting to transmit CGI of cell #1 to the mobile station UE via "RRCConnectionReestablishment" when the reception unit 21 receives "CGI available" via "RRCConnectionReestablishmentRequest" from the mobile station UE and when the received "CGI available" indicates that CGI of cell #1 can be transmitted.

The operations of the mobile station UE and the radio base stations eNB#1/eNB#2 may be performed in hardware, may be performed in software modules executed by the processor, or may be performed in a combination of both.

The software modules may be provided in any storage medium such as RAM (Random Access Memory), flash memory, ROM (Read Only Memory), EPROM (Erasable Programmable ROM), EEPROM (Electronically Erasable and Programmable ROM), register, hard disk, removable disk, or CD-ROM.

The storage medium is connected to a processor such that the processor can read/write information from/into the storage medium. The storage medium may be integrated in the processor. The storage medium and the processor may be provided inside ASIC. The ASIC may be provided in the mobile station UE and the radio base stations eNB#1/eNB#2. The storage medium and the processor may be provided as discrete components inside the mobile station UE and the radio base stations eNB#1/eNB#2.

The present invention has been described above in detail with reference to the embodiment, but it is clear to those skilled in the art that the present invention is not limited to the embodiment described in the present specification. The present invention can be modified and changed in its forms without departing from the spirit and scope of the present invention defined in Claims. Therefore, the description of the present specification intends to be exemplary only, and does not intend to limit the present invention.

The contents of Japanese Patent Application No. 2011-144419 (filed on Jun. 29, 2011) are all incorporated in the present specification by reference.

INDUSTRIAL APPLICABILITY

As described above, according to the present invention, it is possible to provide a mobile communication method capable of successfully performing a reconnection procedure even when a connection destination radio base station does not manage "UE Context" for a mobile station UE, a mobile station, and a radio base station.

REFERENCE SIGNS LIST

UE: Mobile station
eNB#1, eNB#2: Radio base station
11: Control unit
12, 22: Transmission unit
13, 21: Reception unit
23: Context management unit

The invention claimed is:

1. A mobile communication method comprising:
   a step A in which when detecting a radio link failure in a first cell under a first radio base station, a mobile station starts a reconnection procedure for a second radio base station managing a second cell selected in a cell selection processing;
   a step B in which the mobile station transmits Cell Global Identity (CGI) of the first cell to the second radio base station in the reconnection procedure; and
   a step C in which in the reconnection procedure, when not managing context information of the mobile station, the second radio base station acquires context information of the mobile station from the first radio base station managing the first cell designated based on the CGI,
   wherein the step B includes:
      a step B1 in which the mobile station transmits transmission enable/disable information indicating whether the CGI of the first cell can be transmitted to the second radio base station via a reconnection request signal;
      a step B2 in which when the received transmission enable/disable information indicates that the CGI of the first cell can be transmitted, the second radio base station transmits request information for requesting to transmit the CGI of the first cell to the mobile station via a reconnection signal; and
      a step B3 in which the mobile station transmits the CGI of the first cell to the second radio base station via a reconnection complete signal in response to the request information.

2. The mobile communication method according to claim 1, wherein in the step B3, the mobile station does not perform a security processing on the reconnection complete signal.

3. A mobile station comprising:
   a controller configured to start a reconnection procedure for a second radio base station managing a second cell selected in a cell selection processing when detecting a radio link failure in a first cell under a first radio base station; and
   a transmitter configured to transmit Cell Global Identity (CGI) of the first cell to the second radio base station in the reconnection procedure,
      wherein the transmitter is configured to transmit transmission enable/disable information indicating whether the CGI of the first cell can be transmitted to the second radio base station via a reconnection request signal, and
      the transmitter is configured to transmit the CGI of the first cell to the second radio base station via a reconnection complete signal when receiving a reconnection signal containing request information for requesting to transmit the CGI of the first cell from the second radio base station.

4. The mobile station according to claim 3, wherein the transmitter is configured not to perform a security processing on the reconnection complete signal.

5. A radio base station which operates as a second radio base station when a mobile station starts a reconnection procedure for the second radio base station managing a second cell selected in a cell selection processing when detecting a radio link failure in a first cell under a first radio base station, the radio base station comprising:
   a receiver configured to acquire context information of the mobile station from the first radio base station managing the first cell designated based on Cell Global Identity (CGI) of the first cell transmitted by the mobile station when not managing the context information for the mobile station in the reconnection procedure; and
   a transmitter configured to transmit request information for requesting to transmit the CGI of the first cell to the mobile station via a reconnection signal when the reception unit receives transmission enable/disable information indicating whether the CGI of the first cell can be transmitted via a reconnection request signal from the mobile station and when the received transmission enable/disable information indicates that the CGI of the first cell can be transmitted.

* * * * *